May 6, 1924.                                                     1,493,437
                    H. L. LITCHFIELD ET AL
DRIVING MECHANISM FOR DISTRIBUTING MEANS OF MANURE SPREADERS AND THE LIKE
                    Filed Nov. 21, 1921        3 Sheets-Sheet 1
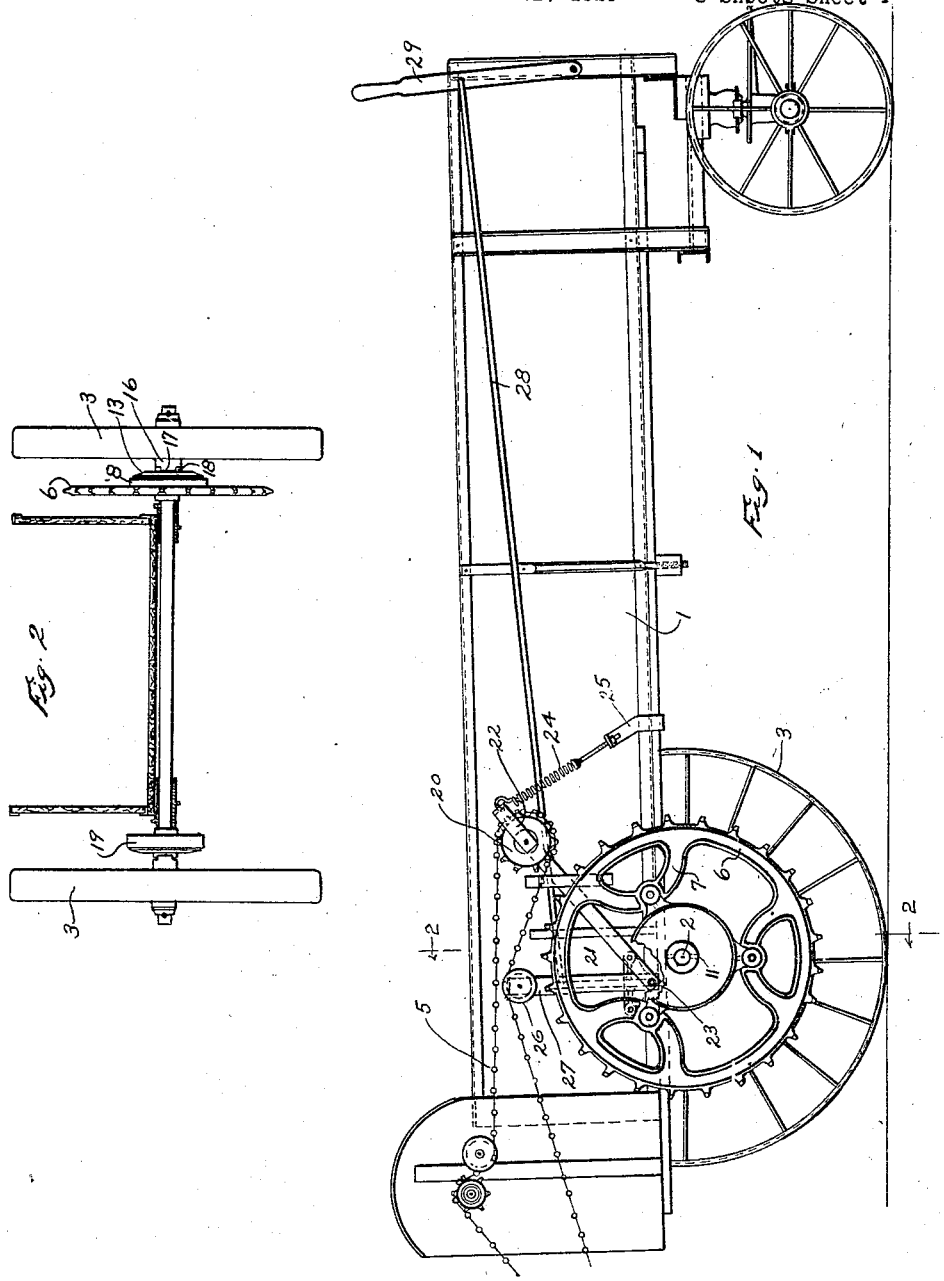
INVENTORS:
H. L. and E. C. Litchfield
Victor Speer.
BY
Chamberlin & Breudenreich
ATTORNEYS.

May 6, 1924.
H. L. LITCHFIELD ET AL
1,493,437
DRIVING MECHANISM FOR DISTRIBUTING MEANS OF MANURE SPREADERS AND THE LIKE
Filed Nov. 21, 1921   3 Sheets-Sheet 2
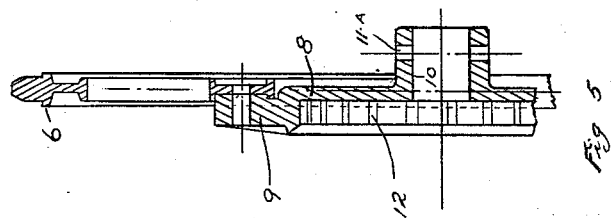
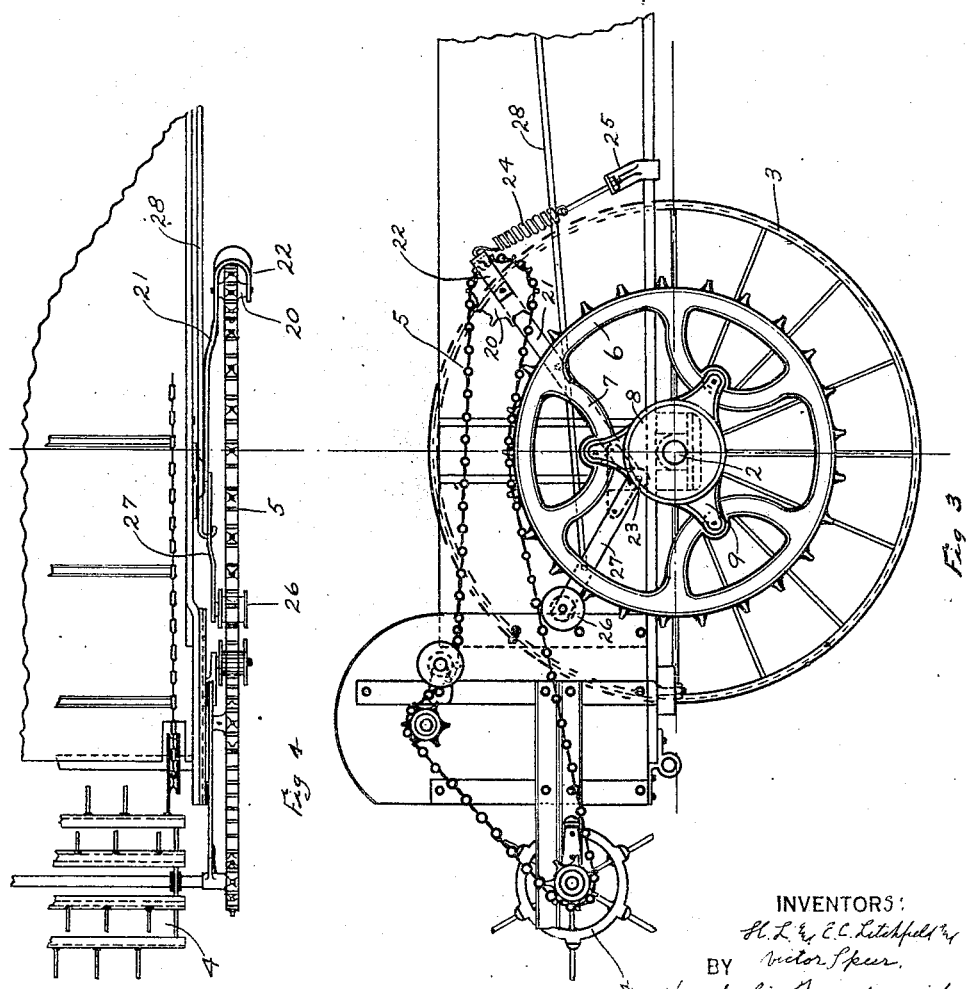
INVENTORS:
H. L. & E. C. Litchfield
BY Victor Speer.
ATTORNEYS May 6, 1924.
H. L. LITCHFIELD ET AL
1,493,437
DRIVING MECHANISM FOR DISTRIBUTING MEANS OF MANURE SPREADERS AND THE LIKE
Filed Nov. 21, 1921    3 Sheets-Sheet 3
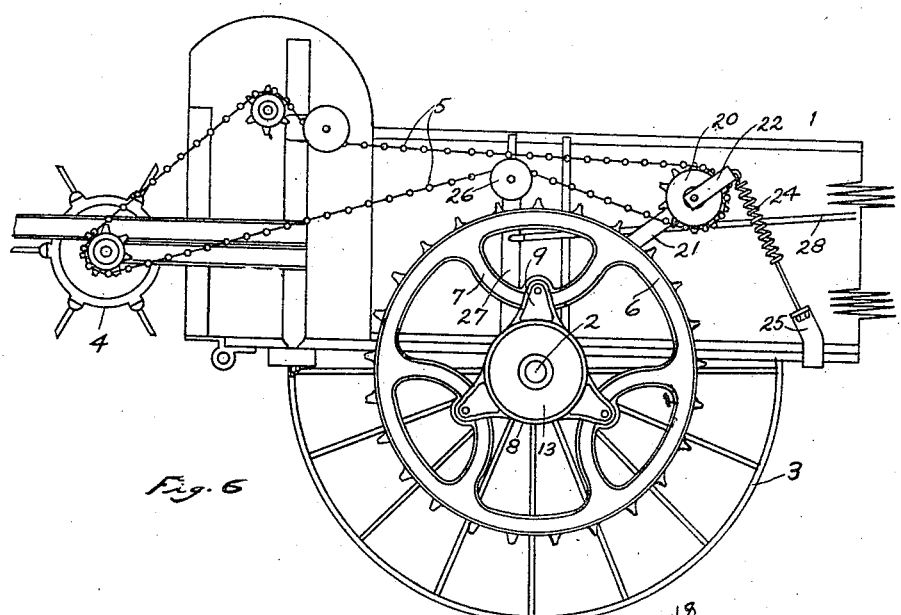
Fig. 6
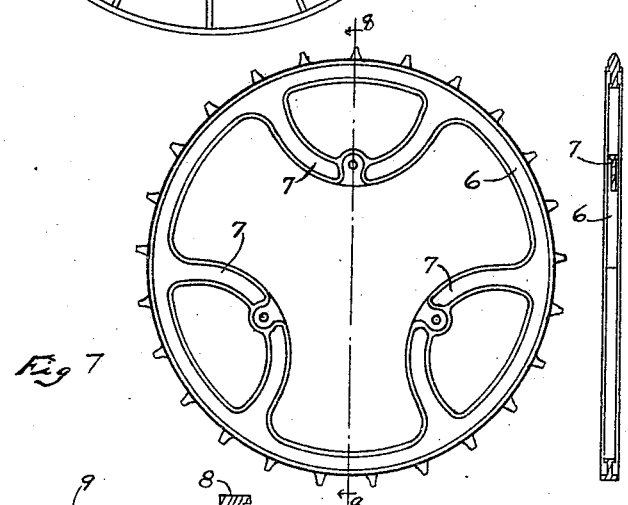
Fig. 7
Fig. 8
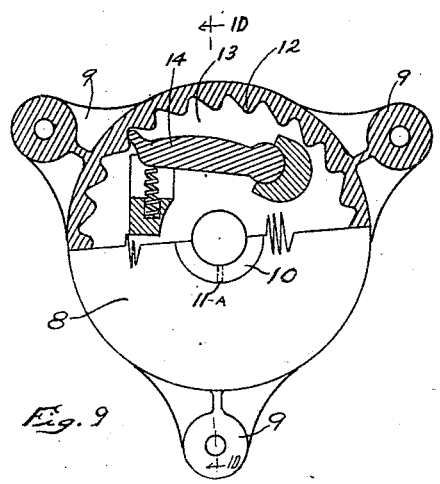
Fig. 9
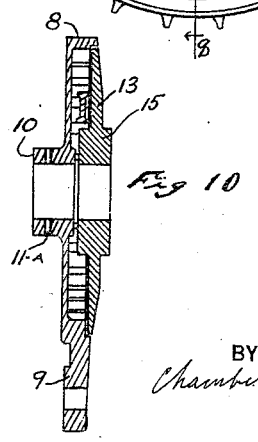
Fig. 10
INVENTORS
H. L. & E. C. Litchfield
Victor Speer
BY
Chamberlin Freudenreich
ATTORNEYS.

Patented May 6, 1924.

1,493,437

UNITED STATES PATENT OFFICE.

HENRY L. LITCHFIELD, EDGAR C. LITCHFIELD, AND VICTOR SPEER, OF WATERLOO, IOWA; SAID SPEER ASSIGNOR TO SAID HENRY L. LITCHFIELD AND SAID EDGAR C. LITCHFIELD.

DRIVING MECHANISM FOR DISTRIBUTING MEANS OF MANURE SPREADERS AND THE LIKE.

Application filed November 21, 1921. Serial No. 516,653.

*To all whom it may concern:*

Be it known that we, HENRY L. LITCHFIELD, EDGAR C. LITCHFIELD, and VICTOR SPEER, citizens of the United States, residing at Waterloo, county of Blackhawk, State of Iowa, have invented a certain new and useful Improvement in Driving Mechanism for Distributing Means of Manure Spreaders and the like, and declare the following to be a full, clear, and exact description of the same, such as will enable others skilled in the art to which it pertains to make and use the same, reference being had to the accompanying drawings, which form a part of this specification.

The present invention relates to machines for distributing fertilizer over a surface across which the machine is drawn and has for its object to simplify and improve the construction and operation and reduce the cost of production of the mechanism for driving the distributing means from the traction wheels of the machine.

The usual manner of transmitting power from the traction wheels to the distributing mechanism is to mount on one of the traction wheels or the axle supporting the same a sprocket wheel by which a transmission device in the form of a sprocket chain is driven. Since the speed of rotation of the traction wheel or axle is very slow as compared with the speed at which it is necessary for the rotating distributing devices to travel, it is necessary either to employ multiplying gears or a very large driving sprocket wheel. The use of multiplying gears of course adds to the expense and increases the complexity of the mechanism. Where a large driving sprocket wheel is employed, having a diameter more than half the diameter of the traction wheels, it must be powerfully built so as to withstand not only the working stresses but also to withstand the shocks due to traveling over rough roads and grounds and even blows due to the striking of the sprocket wheel on the ground when the adjacent traction wheel drops into a rut or other depression. In order not to make the sprocket wheel too costly it should be of cast metal. Furthermore, the sprocket wheel should be as light as possible, this being best brought about by making it in the form of a comparatively light rim supported on the ends of suitable arms or spokes. In casting such a large sprocket wheel, particularly where a comparatively heavy hub is required, great difficulties are encountered by reason of the internal shrinking stresses brought about by the cooling of the metal from a molten state, which stresses, even if they do not result in a fracture of some part of the wheel before the final cooling, will in any event bring about a condition which makes the wheel liable to fracture at any moment while in service; this liability to fracture being particularly great under the conditions which are brought about when the wheel is struck a blow such as occurs when it strikes the ground whenever the adjacent traction wheel drops into a deep rut. One of the objects of the present invention is therefore to produce a large sprocket wheel which shall not only have a moderate initial cost but will be strong and durable and fully capable of withstanding the severest working conditions to which it may be subjected.

The various features of novelty whereby the present invention is characterized will hereinafter be pointed out with particularity in the claims; but, for a full understanding of the present invention and of its objects and advantages, reference may be had to the following detailed description taken in connection with the accompanying drawings, wherein:

Figure 1 is a side elevation of a spreader arranged in accordance with the preferred form of the present invention, the rear traction wheel on the near side being omitted and a portion of the driving sprocket being broken away;

Fig. 2 is a section taken approximately on line 2—2 of Fig. 1, on a smaller scale, only the wheeled axle and the wagon box being shown;

Fig. 3 is a view similar to Fig. 1 on a somewhat larger scale, showing only the rear end of the spreader and also showing the sprocket chain in driving relation to the main sprocket wheel, whereas in Fig. 1 the chain is shown lifted out of engagement with the driving sprocket wheel;

Fig. 4 is a top plan view of that portion of the spreader shown in Fig. 3, only one side of the spreader being shown;

Fig. 5 is a radial section, on an enlarged scale, through a portion of the driving sprocket;

Fig. 6 is a view similar to Fig. 3, showing the sprocket chain lifted from the driving wheel;

Fig. 7 is a side view of the driving sprocket wheel with the hub detached;

Fig. 8 is a section taken approximately on line 8—8 of Fig. 7;

Fig. 9 is a side view of the hub portion of the driving sprocket, a portion being broken away in order to show the clutch mechanism associated therewith; and Fig. 10 is a section taken approximately on line 10—10 of Fig. 9.

Referring to the drawings, 1 represents a vehicle body supported at the rear end on a rotatable axle 2 carrying at its ends traction wheels 3. At the rear end of the spreader body is the distributing mechanism which, in the arrangement shown, consists of a beater wheel 4. The distributing mechanism is adapted to be driven by means of an endless sprocket chain 5 which is in turn adapted to be driven by a driving sprocket actuated by one of the traction wheels. The driving sprocket consists of a large toothed ring 6 which usually will have a diameter considerably greater than one-half the diameter of the traction wheels, the ring being provided with a few spokes which may conveniently be in the form of U-shaped arms 7 the ends of which are integral with the ring. In the arrangement shown, there are three of these U-shaped arms each of which has a cross sectional contour approximating the cross sectional contour of the ring so that the casting will cool uniformly throughout its entire mass after the metal has been poured into the mold. In other words, the sprocket wheel has an open center, there being no connection between the inner ends of the arms or spokes. The open-center sprocket wheel is fastened to a hub member which serves also as a member of a clutch by means of which the wheel may be locked to the adjacent traction wheel so as to be driven thereby when the spreader moves forward, leaving the traction wheel free to move independently of the sprocket wheel when the spreader is moved backwards or whenever the axle is traveling faster than the traction wheel. This hub may conveniently take the form of a cup-shaped member 8 having radially-projecting ears 9 each of which is adapted to be bolted to the middle of one of the U-shaped arms 7 of the sprocket wheel. The member 8 is provided with a central sleeve or hub 10 which may be fixed to the axle by a suitable fastening device 11 passing through the axle and through holes 11ᵃ arranged in the member 10 at diametrically opposed points. Around the interior of the sides of the cup are ratchet teeth 12. The mouth of the cup is closed by a disc 13 carrying on the inner side a suitable spring-pressed pawl 14 which co-operates with the ratchet teeth 12. The member 13 has a hub 15 interlocked in any suitable way with the hub 16 of the adjacent traction wheel, so that the disc rotates with the traction wheel. The interlock between the disc and the traction wheel may conveniently be effected, as best shown in Fig. 2, by providing the inner end of the hub of the wheel with one or more notches 17 in which are seated one or more projections 18 on the hub 15.

On the opposite side of the spreader there is provided a similar clutch which I have indicated as a whole at 19; this clutch being identical with the clutch just described except that the member corresponding to the member 8 does not have the ears 9 by means of which the member 8 is attached to the open-center sprocket wheel. The provision of two clutches permits the axle, and consequently the distributing mechanism, to be driven either from both traction wheels or from that of the two traction wheels which is traveling the faster.

These two clutches in themselves are old and well known and have to do with the present invention only in so far as one of the members of one of them must serve as the hub of the main sprocket wheel, and therefore gives rise to the problem of constructing that wheel in a manner which will avoid undue weight without bringing about structural weaknesses.

The sprocket chain does not surround the driving sprocket wheel but extends across the top of the same in the form of a loop the lower run of which is adapted to rest on the sprocket wheel. In the closed front end of the loop is an idle sprocket wheel 20 rotatably mounted in the upper end of a swinging arm 21. The swinging arm may conveniently be in the form of a strap the upper end of which is bent back as indicated at 22 so as to provide a jaw or fork within which the sprocket wheel lies. The lower end of the arm 21 is pivoted to the body of the spreader as indicated at 23, at a point somewhat above the axle; the parts being so proportioned that the arm inclines upwardly and forwardly from its point of support to its free end. At the free end of the supporting arm 21 is fixed one end of a spring 24 the other end of which is fastened by any suitable means 25 to the body of the spreader, the spring being arranged approximately at right angles to the arm and being normally under tension so that it tends constantly to swing the arm downwardly and thus carry the idle sprocket wheel 20 forwardly around the driving sprocket wheel. By this means the sprocket chain will be laid upon the driving sprocket wheel when the spring is left free to act, and any slack which may occur in the chain at any time will be taken up by the spring.

It is not always desired to cause the distributing mechanism to operate whenever the spreader is being moved ahead and therefore some means must be provided for interrupting the driving connection when it is desired to do so. In the arrangement shown, there is provided a roller 26 mounted on the upper end of a swinging arm 27 the lower end of which may conveniently be supported by the same pivotal connection 23 that supports the swinging arm 21. The member 27 is made long enough so that when it is in an upright position as shown in Figs. 1 and 6, the roller lifts the lower run of the chain clear of the driving sprocket wheel. This is accomplished against the tension of the spring 24 and without lifting the upper run of the forward end of the chain except through the slight distance which may perhaps be necessary because of a slight upward swinging movement of the arm 21. In any event, there need be no substantial shifting or adjustment of any part of the chain except simply the lower run of the loop. When the member 27 is swung back into the position shown in Fig. 3, the roller is lowered away from the chain so as not to interfere with the movements of the latter. The member 27 is controlled by means of a rod 28 which extends to the front end of the spreader where it may conveniently be attached to a hand lever 29 within easy reach of the driver.

While we have illustrated and described with particularity only a single preferred form of our invention, we do not desire to be limited to the exact structural details thus illustrated and described; but intend to cover all forms and arrangements which come within the terms employed in the definitions of our invention constituting the appended claims.

We claim:

1. In a spreader, distributing mechanism, a driving sprocket wheel, an endless sprocket chain associated with said mechanism to drive the same extending in a loop past one side of said wheel, a yieldable tension device engaged with said loop and tending constantly to hold one run thereof against the wheel and at the same time keep the chain taut, and means independent of said tension device for lifting the aforesaid run of the loop clear of the wheel without producing a substantial lifting movement in the other run.

2. In combination, a driving sprocket wheel, mechanism to be driven, an endless sprocket chain extending from said mechanism in a loop past one side of said wheel, a yieldable tension device acting on said loop and tending constantly to hold that run thereof nearest the wheel in contact with the wheel, and means independent of said tension device for lifting the aforesaid run of the loop away from the wheel by flexing it toward the opposite run.

3. In combination, a sprocket wheel, an endless sprocket chain extending in a loop past one side of said wheel, a second sprocket wheel arranged in the end of said loop, means yieldingly supporting said second sprocket wheel so as to cause it to tend constantly to hold one run of said chain in engagement with the first mentioned sprocket wheel, and means acting directly on the aforesaid run of the loop for lifting it away from the first mentioned sprocket wheel against the resistance offered by the supporting means for the other wheel.

4. In combination, a sprocket wheel, an endless sprocket chain extending past one side of said wheel in a loop lying in the plane of said wheel, a yieldable tension device acting on the closed end of the loop to take up the slack in the chain and yieldingly hold one run of the loop in engagement with said sprocket wheel, and means acting directly on said run of the loop to lift it away from the sprocket wheel against the resistance offered by said tension device.

5. In combination, two sprocket wheels, an endless sprocket chain extending past one side of the first of the sprocket wheels in the form of a loop passing around the second of said sprocket wheels, a yieldable support for the second of said sprocket wheels tending constantly to move it in a direction to take up slack in the chain and hold one run of the chain against the first sprocket wheel, and means independent of said support for lifting only the aforesaid run of the chain without substantially lifting the other run to release the chain from the first sprocket wheel.

6. In combination, a sprocket wheel, an endless sprocket chain extending in a loop past one side of said sprocket wheel, a yieldable tension device acting on said loop in a direction tending constantly to hold one run of the loop in engagement with said sprocket wheel, a roller, and means independent of said tension device for lifting said roller from a position in which it is out of contact with said chain into a position in which it engages with the aforesaid run and lifts it clear of said wheel.

7. In combination, a sprocket wheel, an endless sprocket chain extending in a loop past one side of the wheel, a second sprocket wheel in the closed end of the loop, means for supporting said second sprocket wheel so as constantly to tend to move it circumferentially of the first wheel in a direction to take up the slack in the chain and lay one run of the loop against the first mentioned wheel, and means independent of said tension device for lifting the aforesaid run of the loop without substantially lifting the other run to carry the chain out of engagement with the first mentioned wheel.

8. In combination, a sprocket wheel, a sprocket chain extending past one side of the wheel in the form of a loop, a second sprocket wheel positioned in the closed end of said loop, a swinging support for said second sprocket wheel permitting it to travel bodily in the circumferential direction about the first mentioned wheel, a spring acting on said support in the direction which causes said second sprocket wheel constantly to move in a direction which will take up slack in the chain and lay one run of the loop against the first mentioned sprocket wheel, and means for lifting the aforesaid run of the loop to carry the chain out of engagement with the first mentioned sprocket wheel against the tension of said spring.

9. In combination, a sprocket wheel, a sprocket chain extending past one side of the wheel in the form of a loop, a second sprocket wheel positioned in the closed end of said loop, a swinging support for said second sprocket wheel permitting it to travel bodily in the circumferential direction about the first mentioned wheel, a spring acting on said support in the direction which causes said second sprocket wheel constantly to move in a direction which will take up slack in the chain and lay one run of the loop against the first mentioned sprocket wheel, a swinging arm mounted adjacent to the first mentioned sprocket wheel, a roller on the free end of said arm, and means for shifting said arm from a position in which the roller is out of contact with the chain to a position in which it underlies the aforesaid run of the chain and holds it away from the first mentioned sprocket wheel.

10. In a spreader, distributing mechanism, a driving sprocket wheel, an endless sprocket chain associated with said mechanism to drive the same and extending in a loop across the top of said driving wheel, a yieldable tension device engaged with the closed end of said loop and tending constantly to hold the lower run of the latter against said wheel, and means controlled from the front end of the spreader for acting directly on the aforesaid run to lift it upwardly out of engagement with said wheel.

11. In a spreader, distributing mechanism, a driving sprocket wheel, an endless sprocket chain associated with said mechanism to drive the same and extending in a loop across the top of said driving wheel, a yieldable tension device engaged with the closed end of said loop and tending constantly to hold the lower run of the latter against said wheel, a swinging arm mounted adjacent to said wheel, said arm having a roller at its free end lying in the plane of said loop, and means for swinging said arm from an idle position in which the roller lies below and out of contact with the lower run of the chain to a working position in which the roller engages with the lower run of the chain and holds it raised out of engagement with the sprocket wheel.

In testimony whereof, we sign this specification.

HENRY L. LITCHFIELD.
EDGAR C. LITCHFIELD.
VICTOR SPEER.